UNITED STATES PATENT OFFICE.

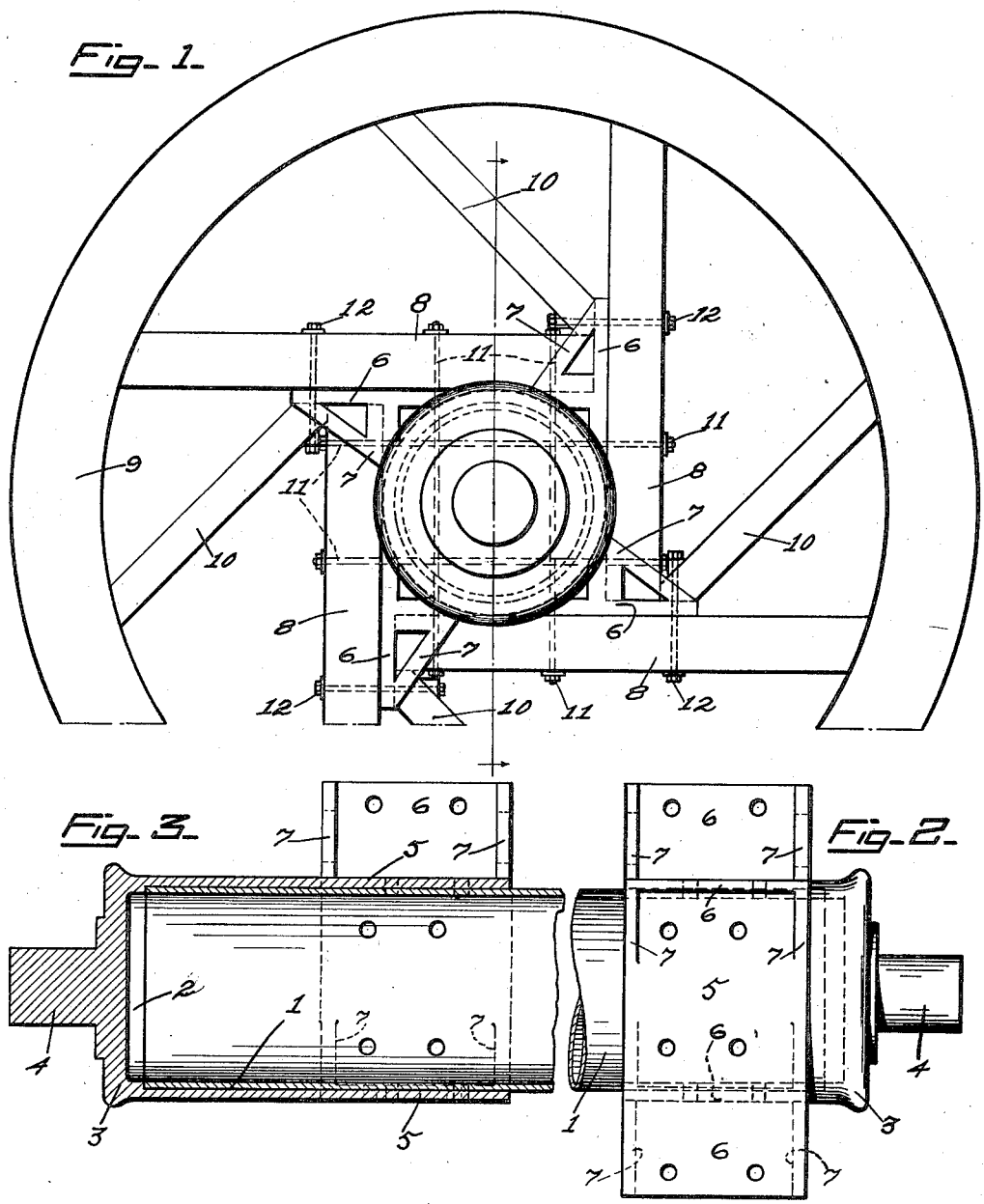

WILLIAM M. KECK, OF COALINGA, CALIFORNIA.

BULL-WHEEL GUDGEON.

1,160,513.  Specification of Letters Patent.  Patented Nov. 16, 1915.

Application filed April 19, 1915. Serial No. 22,246.

*To all whom it may concern:*

Be it known that I, WILLIAM M. KECK, a citizen of the United States, residing at Coalinga, in the county of Fresno and State of California, have invented certain new and useful Improvements in Bull-Wheel Gudgeons, of which the following is a specification.

The present invention relates to improvements in oil well apparatus, and more particularly to a construction of a bull wheel shaft and supporting ends or gudgeons therefor.

The invention has for its objects to provide a construction wherein the shaft, the gudgeons, and the bull wheel are secured together by a common fastening means, to provide a gudgeon formed with radially disposed arms for supporting the inner end of the bull wheel spokes, whereby the spokes will be braced for a portion of their length and will be relieved of a portion of the strain thereon, and to provide a gudgeon which will permit the side faces of the spokes to rest against a face on the gudgeon thereby providing a solid rest for the spokes along their side faces and providing a stronger structure than where the spokes are only connected at their beveled ends.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, wherein—

Figure 1 is a view in end elevation of a bull wheel and gudgeon embodying my invention, disclosing the arms or flanges formed integrally with the gudgeon for supporting the bull wheel spokes for a portion of their length. Fig. 2 is a view in elevation of a portion of the shaft and gudgeon. Fig. 3 is a view in longitudinal section of the gudgeon and a portion of the shaft.

Referring more particularly to the several views of the drawings wherein like characters of reference designate corresponding parts throughout the several views, the numeral 1 indicates a suitable tubular shaft the end of which is received in the hollow portion 2 of a suitable gudgeon 3, preferably formed of cast metal and provided at its end with a journal 4. The material surrounding the hollow portion 2 of the gudgeon provides a hub and the hub is formed with a plurality of flat faces 5 from one end of which extend the overhanging arms 6 strengthened by the braces 7 which connect with the underside of one side edge of the arms and the hub portion.

A bull wheel spoke 8 extends longitudinally of each face 5 and projects beyond the outer end of the overhanging arm 6 associated therewith, and said spokes carry the rim 9 at their outer ends. The inner ends of the spokes abut against the underside of the arm 6 of the next flat face, and are thereby provided with a rigid support at their inner ends.

Suitable braces 10 extend from points at the junctions of the rear ends of the arms 8 and connect with the rim 9 at points intermediate the spokes.

The inner portions of the spokes are secured to the flat faces 5 by suitable bolts 11 which also extend through the shaft 1 and retain the gudgeon thereon. Bolts 12 connect the outer ends of the arms 6 of the flat surfaces with the spokes, and retain the inner ends of the braces in position and extend through the spokes and gudgeon.

It will be apparent that I have provided a structure wherein the securing means for the spokes extend through the gudgeon and shaft, thereby securely fastening the parts together and preventing one from turning relative to the other. The bolts extending through the spokes, gudgeon, and shaft are arranged at right angles to each other, thereby distributing the strain, and the arms formed integral with each flat surface provide a support for each spoke and relieve the strain on the outer ends thereof.

Having thus described my invention what I claim is:—

1. In combination, a shaft, a gudgeon formed at one end with a hollow portion into which said shaft extends and provided on its opposite end with a journal, the outer surface of said gudgeon formed with a plurality of faces, a bull wheel having the inner end of its spokes lying flat against said faces, and a plurality of securing means extending through said spokes, gudgeon and shaft, each end of said securing means retaining separate spokes in position.

2. In combination, a shaft, a gudgeon formed at one end with a hollow portion into which said shaft extends and provided on its opposite end with a journal, the outer surface of said gudgeon being formed with a plurality of faces and a plurality of arms formed integral with said gudgeon and each of said arms being a continuation of one of said faces and overhanging one end of one of said faces.

3. In combination, a shaft, a gudgeon formed at one end with a hollow portion into which said shaft extends and provided on its opposite end with a journal, the outer surface of said gudgeon being formed with a plurality of faces, a plurality of arms formed integral with said gudgeon and each providing a continuation of one of said faces and overhanging an adjacent face, a bull wheel having the inner ends of its spokes lying flat against said faces and contacting with the underside of the overlying arms, and a plurality of securing means each extending through said spokes, gudgeon and shaft.

4. In combination, a shaft, a gudgeon formed at one end with a hollow portion into which said shaft extends and provided on its opposite end with a journal, the outer surface of said gudgeon being formed with a plurality of faces, a plurality of arms formed integral with said gudgeon and each of said arms being a continuation of one of said faces and overhanging one end of one of said faces, and a plurality of securing means extending through said gudgeon and shaft.

In testimony whereof I have signed my name to this specification in the presence of two subscribing witnesses.

WILLIAM M. KECK.

Witnesses:
A. P. MAY,
ARTHUR G. WEBB.